United States Patent [19]

Nakagawa et al.

[11] Patent Number: 5,391,214
[45] Date of Patent: Feb. 21, 1995

[54] METHOD AND APPARATUS FOR MANUFACTURING GLASS BOTTLES

[75] Inventors: Manabu Nakagawa; Masatoshi Shibata, both of Tokyo, Japan

[73] Assignee: Kirin Beer Kabushiki Kaisha, Tokyo, Japan

[21] Appl. No.: 115,824

[22] Filed: Sep. 3, 1993

[30] Foreign Application Priority Data

Nov. 20, 1992 [JP] Japan .................................. 4-311976

[51] Int. Cl.⁶ .......................................... C03B 35/10
[52] U.S. Cl. ................................. 65/29.1; 65/60.1; 65/60.5; 65/69; 65/118; 65/163; 65/229; 65/260; 65/348; 118/324; 198/432
[58] Field of Search ................. 65/29.1, 60.1, 60.5, 65/60.52, 60.53, 69, 118, 163, 229, 260, 262, 306, 348, 181, 62; 118/324; 198/432

[56] References Cited

U.S. PATENT DOCUMENTS

| | | | |
|---|---|---|---|
| 3,305,342 | 2/1967 | Hofferkamp | 65/260 |
| 3,451,795 | 6/1969 | Budd | 65/118 |
| 3,516,811 | 6/1970 | Gatchet et al. | 65/163 |
| 3,765,856 | 10/1973 | Bowman | 65/260 |
| 4,477,494 | 10/1984 | Ali-Zaidi | 65/60.5 |

Primary Examiner—Joye L. Woodard
Attorney, Agent, or Firm—Oblon, Spivak, McClelland, Maier & Neustadt

[57] ABSTRACT

The problem of unevenness of bottle temperatures at the entry of slow annealing furnace due to the variation of time periods necessary for respective bottles discharged from an IS bottle manufacturing machine to reach the annealing furnace has been solved by an equalization of said time periods. For this purpose, the bottle discharging order from the IS bottle manufacturing machine is controlled and use is made of two conveyors having different running speeds and/or direction of running. As a result, a precise temperature control in the Hot-End-Coating apparatus provided upstream from the annealing furnace can be carried out owing to the equalized temperatures of bottles entering into the annealing furnace.

4 Claims, 5 Drawing Sheets

METHOD AND APPARATUS FOR MANUFACTURING GLASS BOTTLES

BACKGROUND OF THE INVENTION

FIELD OF THE ART

The present invention relates to an improved method for manufacturing glass bottles using the so-called "IS bottle manufacturing machines", or simply "IS machine".

Specifically, the present invention relates to an improved method for manufacturing glass bottles wherein a group of glass bottles discharged from IS bottle manufacturing machine are fed with the same temperature into a slow cooling furnace or annealing furnace.

More specifically, the present invention relates, in one of its preferred embodiment, to an improved method for manufacturing glass bottles wherein a group of bottles to be treated can be treated at the same temperature in the so-called "Hot-End-Coating" process which carries out the surface treatment of glass bottles before the annealing process thereof.

It is to be noted that the details of said IS bottle manufacturing machine are described hereinbelow with respect to the present invention, but more generally for further details of said bottle manufacturing machine, reference will be made to various documents such as for example "Glass Engineering" of Naruse Sho published from Kyoritsu Shuppan Co. Ltd., "Dictionary of Glass" of Sakuhana Sumio published from Asakura Shoten and "Handbook for Glass Engineering" of Moritani Taro published from Asakura Shoten, all in Japanese.

RELATED ART

Glass bottles are in general manufactured by blowing process, and in industry they are almost blown through the bottle manufacturing machines called IS machines. The IS bottle manufacturing machines comprise a plurality of (for example, six) series of unitary apparatus carrying out a series of treatments such as receiving of predetermined volume of molten glass (called "gobs"), introducing said gobs into a preliminary arough mold (called "blank mold") to transform them into cylindrical form having bottoms (called "parison"), shifting said parisons into a finishing mold (called "blow mold") in which said parisons are expanded into bottles having the shape of the inner surface of said finishing mold by blowing of gas, typically air, and discharging the finished bottles in hot state. Since a plurality of series (called units) of the same dimensions are arranged adjacent to each other, the bottle discharging positions in IS bottle manufacturing machine are arranged substantially in line and substantially with the same distances.

Since gobs are distributed one by one into respective units which are arranged substantially in line and substantially with the same distances, the distributing order of gobs is not in the arranging order of six series(or units), for example 1-2-3-4-5-6 with bottle distances of 10.5 inches when bottles flow from system 1 to system 6 in the left direction, but generally in other order, for example 1-2-5-6-3-4. Thus, in this example, bottles discharged from discharging positions of respective units and mounted on respective bottle feeding conveyors are fed farther to an annealing furnace in the order of 1-6-3-2-5-4. It is to be noted that the distributing order of gobs into respective units of IS bottle manufacturing machine is called "Firing Order". FIG. 1 represents diagrammatically this firing order.

Since respective units are arranged in line, the distances from respective discharging positions to the annealing furnace, i.e. the time periods necessary for bottles to arrive at the annealing furnace, are different from each other. Even if the progressing order of discharged bottles may be 1-2-5-5-3-4, the arrival moments of respective bottles to the annealing furnace can not be the same. In other words, the cooling rates of respective bottles starting from discharge out of the IS bottle manufacturing machine are not the same, so that the temperatures of respective bottles when they are entering into the annealing furnace are also different from each other.

The difference of temperatures of respective bottles may not be a particular problem from the view point of annealing, but can be a problem when a surface treatment of the outer surface of bottles, so called "Hot-End-Coating" is carried out.

The Hot-End-Coating process consists of utilizing the hot state of discharged bottles to bring these bottles in contact with vapor of compounds which is decomposed at said temperature of bottles or at lower treating temperatures to form desired coating (based for example on $SnO_2$ or $TiO_2$). This process has been used only for so-called "one-way bottles" (bottles not to be recovered and reused) and considered not useful for so-called returnable bottles (bottles to be recovered) which needs an alkali washing. However, it was found by the applicants that the coating can be made resistant against the alkali washing by when the processing conditions are skillfully selected. (Refer to Japanese Patent Laid-Open Publication No. 131547/1991).

More specifically, the Hot-End-Coating process described by the applicants comprises the step of bringing the surface of a bottle having a temperature of 550°–700° C. in contact with a material which can form a membrane based on $SnO_2$ or $TiO_2$ thereby to obtain a membrane having a thickness of 400–1000 A on the bottle surface. Under these conditions, bottles having each coating membrane of metal oxide on their outer surface can be obtained, with said coating membrane based on $SnO_2$ or $TiO_2$ and having a peeling time of more than 8 hours when immersed in aqueous solution of 4 weight % of caustic soda at 80° C.

As described above, since the Hot-End-Coating process according to the applicants needs a relatively critical temperature control, desired conditions may not be achieved on the glass bottles discharged from the heretofore known IS bottle manufacturing machines.

SUMMARY OF THE INVENTION

Accordingly, it is among the objects of the present invention to eliminate the above described problems which have been encountered in the known IS bottle manufacturing machines.

According to the present invention, the above object is achieved by specifying the discharging order of bottles from the IS bottle manufacturing machine and by using two separate bottle feeding conveyors having different feeding speeds for feeding bottles to the annealing furnace thereby to equalize the time periods for respective bottles to be fed from the IS bottle manufacturing machine to the annealing furnace or the Hot-End-Coating apparatus.

Accordingly, the present invention, in one aspect thereof or as a first embodiment thereof provides the improvement in a method of manufacturing glass bottles comprising the steps of receiving bottles successively discharged in a hot state from a plurality of discharging positions on a bottle manufacturing machine arranged substantially in line and substantially with same distances on a bottle feeding conveyor, finally feeding said bottles to an annealing furnace, which improvement comprises:

(a) discharging bottles in the order from the discharging position farthest from the annealing furnace successively to the position nearest to the annealing furnace so that the bottle at the position farthest from the annealing furnace firstly come out and the bottle at the position nearest to the annealing furnace lastly comes out:

(b) receiving the discharged bottles on a first bottle feeding conveyor running towards said annealing furnace with the same order of said bottles arranged on said first conveyor as the discharging order, so that the firstly discharged bottle stands at the position nearest to the annealing furnace and with the lastly discharged bottle stands at the position farthest from the annealing furnace;

(c) shifting the group of bottles arranged on the first conveyor onto a second conveyor which is arranged in parallel relationship with the first conveyor so as to reach the annealing furnace;

(d) controlling the speeds of said two conveyors as described in the equation:

$$V_2 = V_1 - h/t$$

wherein, the speed of first conveyor is designated by $V_1$, the speed of second conveyor is designated by $V_2$, the distance between adjacent discharging positions is designated by h, and the time lag between bottle discharges from adjacent discharging positions is designated by t.

The present invention, in another aspect thereof or a second embodiment thereof, provides the improvement in a method of manufacturing glass bottles comprising the steps of receiving bottles successively discharged in a hot state from a plurality of discharging positions arranged substantially in line and substantially with same distances on a bottle manufacturing machine on a bottle feeding conveyor, and finally feeding said bottles to an annealing furnace, which improvement comprises:

(a) discharging bottles in the order from the discharging position nearest to the annealing furnace to the position farthest from the annealing furnace so that the bottle at the position nearest to the annealing furnace firstly comes out and the bottle at the position farthest to the annealing position lastly comes out:

(b) receiving the discharged bottles on a first bottle feeding conveyor having running direction backwards from the annealing furnace with the same order of said bottles arranged on said first conveyor as the discharging order, so that the firstly discharged bottle stands at the position nearest to the slow cooling furnace and the lastly discharged bottle stands at the position farthest from the annealing furnace;

(c) shifting the group of bottles arranged on the first conveyor onto a second conveyor which is arranged in parallel relationship with the first conveyor so as to reach the annealing furnace;

(d) controlling the speeds of said two conveyors as described in the equation:

$V_2 = -(V_1 - h/t)$ controlling the speeds of said two conveyors as described in the equation:

$$V_2 = -(V_1 - h/t)$$

wherein, the speed of first conveyor is designated by $V_1$, the speed of second conveyor is designated by $V_2$, the distance between adjacent discharging positions is designated by h, and the time lag between bottle discharges from adjacent discharging positions is designated by t.

The present invention, in still another aspect thereof or a third embodiment thereof, prvides the improvement in a method of manufacturing glass bottles comprising the steps of receiving bottles successively discharged in a hot state from a plurality of discharging positions of a bottle manufacturing machine arranged substantially in line and substantially with same distances on a bottle feeding conveyor, and finally feeding said bottles to an annealing furnace, which improvement comprises:

(a) receiving the bottles discharged from discharging positions of the bottle manufacturing machine onto a first bottle feeding conveyor running toward said annealing furnace with the same discharging order as the discharging positions, so that the firstly discharged bottle stands at the position nearest to the annealing furnace and the lastly discharged bottle stands at the position farthest from the slow cooling furnace;

(b) shifting the bottles arranged on the first conveyor individually onto a second conveyor which is arranged in parallel relationship with the first conveyor and running toward the annealing furnace;

(c) conducting said shifting of bottles from the first bottle feeding conveyor onto the second bottle feeding conveyor by pushers located along a side of the first bottle feeding conveyor so that each pusher pushes each bottle, these pushers being arranged in such a manner that the pusher corresponding to the bottle discharged from the discharging position nearest to the annealing furnace is located on the most upstream side and the pusher corresponding to the bottle discharged from the discharging position farthest from the annealing furnace is located on the most downstream side, and the distance d between adjacent pushers is defined as $d = h/V_2/(V_1 - V_2)$ wherein the speed of the first conveyor is designated by $V_1$, that of the second conveyor is designated by $V_2$, and the distance between adjacent discharging positions is designated by h, whereby the order of bottles on the second conveyor is the same as the discharging order from the bottle manufacturing machine so that firstly discharged bottle stands at the nearest position and the lastly discharged bottle stands at the farthest position with respect to the annealing furnace, (d) controlling the speeds of said two conveyors as described in the equation:

$$V_1 = V_2 \times (d+h)/d$$

wherein the speed of the first conveyor is designated by $V_1$, that of the second conveyor is designated by $V_2$, the distance between adjacent discharging positions is designated by h, and the distance between adjacent pushers being designated by d.

The present invention relates also to a machine for manufacturing glass bottles.

The present invention, in further aspect thereof or a fourth embodiment thereof, prvides an apparatus for manufacturing glass bottles to be combined with an annealing furnace which comprises:

(i) a machine for manufacturing glass bottles comprising a plurality of units for carrying out a series of processes of receiving a predetermined volume of molten glass, introducing said molten glass into a blank mold to transform it into a cylindrical body having a bottom, shifting said cylindrical body into a blow mold in which said cylindrical body is expanded into a bottle having an outer shape corresponding to the inner surface of said blow mold by blowing of gas, and discharging the finished bottle successively in hot state, with said units being arranged adjacent to each other substantially in line, and with the discharging order of bottles being from the discharging position farthest from the annealing furnace and successively to the position nearest to the annealing furnace;

(ii) a first bottle feeding conveyor running toward the annealing furnace and carrying thereon the bottles successively discharged from said bottle manufacturing machine;

(iii) a second bottle feeding conveyor arranged in parallel relationship with said first bottle feeding conveyor and running toward said annealing furnace;

(iv) a pusher for pushing laterally a group of bottles on said first bottle conveyor and shifting the same onto said second bottle conveyor, the speeds of said two conveyors being controlled as described in the equation:

$$V_2 = V_1 - h/t$$

wherein the speed of first conveyor is designated by $V_1$, the speed of second conveyor is designated by $V_2$, the distance between adjacent discharging positions is designated by h, and the time lag between bottle discharges from adjacent discharging positions is designated by t.

A further apparatus for manufacturing glass bottles to be combined with an annealing furnace according to the invention, in still further aspect thereof or a second embodiment thereof, comprises:

(i) a machine for manufacturing glass bottles comprising a plurality of units for carrying out a series of processes of receiving a predetermined volume of molten glass, introducing said molten glass into a blank mold to transform it into a cylindrical body having a bottom, shifting said cylindrical body into a blow mold in which said cylindrical body is expanded into a bottle having an outer shape corresponding to the inner surface of said blow mold by blowing of gas, and discharging the finished bottle successively in hot state, with said units being arranged adjacent to each other substantially in line, and with the discharging order of bottles being from the discharging position nearest to the annealing furnace and successively to the position farthest from the annealing furnace;

(ii) a first bottle feeding conveyor running in a direction backwards from said annealing furnace and carrying thereon the bottles successively discharged from said bottle manufacturing machine;

(iii) a second bottle feeding conveyor arranged in parallel relationship with said first bottle feeding conveyor and running toward said annealing furnace;

(iv) a pusher for pushing laterally a group of bottles on said first bottle conveyor and shifting the same onto said second bottle conveyor, the speeds of said two conveyors being controlled as described in the equation:

$$V_2 = -(V_1 - h/t)$$

wherein the speed of first conveyor is designated by $V_1$, the speed of second conveyor is designated by $V_2$, the distance between adjacent discharging positions is designated by h, and the time lag between bottle discharges from adjacent discharging positions is designated by t.

Preferred embodiment of the invention, is such that glass bottles on the second conveyor are fed into a Hot-End-Coating apparatus located in the upstream of the annealing furnace.

According to the present invention, the distributing order of gobs is set as the same as the discharging order of bottles or the reverse order and two separate conveyors having different speeds are used, whereby the difference of time periods necessary for respective bottles to reach the annealing furnace due to different discharging of bottles can be offset by the difference of speeds of respective conveyors. Therefore, respective successively progressing glass bottles can reach the annealing furnace or the Hot-End-Coating apparatus after the same time elapses and thus with the same cooled state after they are discharged from the IS bottle manufacturing machine.

BRIEF DESCRIPTION OF THE DRAWINGS

For a better understanding of the present invention, reference is made to the following detailed description taken in conjunction with the accompanying drawings, in which.

DETAILED DESCRIPTIONS OF EXEMPLARY EMBODIMENTS

The IS bottle manufacturing machine which is an object to improve by the present invention is of well known type as described above.

<IS bottle manufacturing machine>

According to the invention, a conventional IS bottle manufacturing machine comprising a plurality of unitary bottle-manufacturing series (called "unit") combined to each other is operated in such a manner that the discharging order of bottles from said machine starts from the bottle farthest from annealing furnace and ends in the bottle nearest to the annealing furnace, or the reverse thereto.

Each unit can manufacture a plurality of bottles, for example two bottles in a single process, in addition to a single bottle in the process. In the case of producing a plurality of bottles, it is presumed that the specific bottle illustrated in the attached figures, for example ①, consists of a plurality of bottles, because said plurality of bottles are discharged from the same bottle manufacturing machine at the same temperature, and these bottles have little distances between them when they progress in series on the bottle feeding conveyor, so that the difference of time periods required for them to be discharged from said machine and arrive at said slow cooling furnace can be substantially neglected.

One of the features of the present invention is in that two bottle feeding conveyors are combined with an IS bottle manufacturing machine as described above. The bottle feeding conveyors used in the present invention are of the well known type, typically belt conveyors, including various types of conveyors.

The use of two bottle feeding conveyors according to the invention requires a pusher for laterally pushing a group of or individual bottles from the first bottle feeding conveyor onto the second bottle feeding conveyor. The pusher itself to be used in the present invention is of the well known type and any suitable pusher can be used.

<Principle utilized in the improvement>

According to the invention, the problem which is inherent in the IS bottle manufacturing machine, i.e. the problem that the time periods required for yet hot bottles discharged from the machine to enter into the annealing furnace are different by bottle by bottle depending upon their respective discharging orders, is eliminated by a time-control such that preceding bottles discharged from the machine can earlier enter into the annealing furnace than the succeeding ones.

The principle of such an improvement is based upon the control for receiving hot glass bottles discharged from the machine on the first bottle feeding conveyor in their discharging order, and shifting them individually or in a group onto the second bottle feeding conveyor thereby to charge the preceding earlier discharged and more cooled bottles into the annealing furnace, earlier than the succeeding bottles.

Such a principle can be realized by three embodiments as follows.

Figure 1:
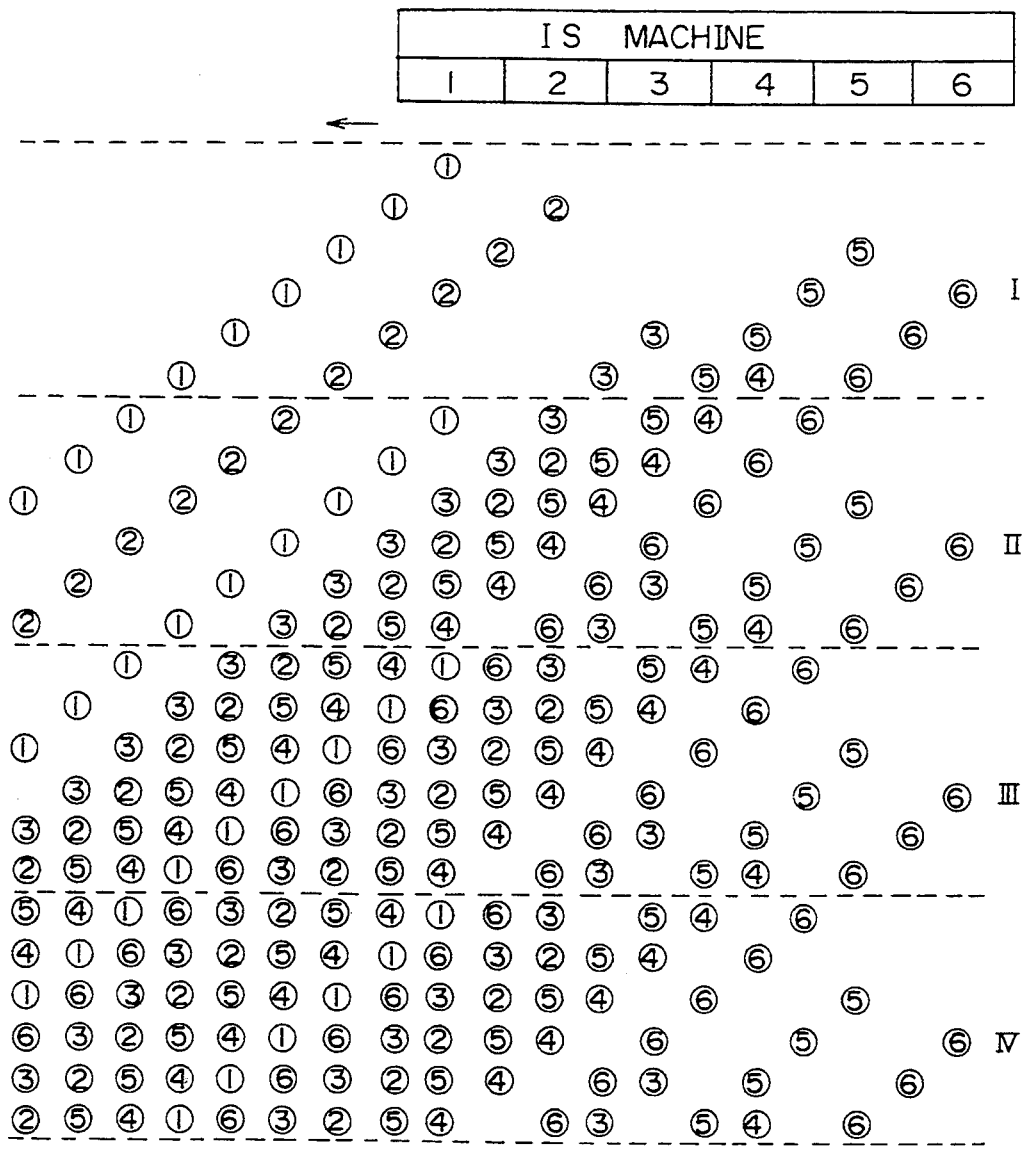
FIG. 1 is a diagram illustrating the discharging order and the arranging order on conveyors of bottles in the known type of an IS bottle manufacturing machine.
Figure 2:
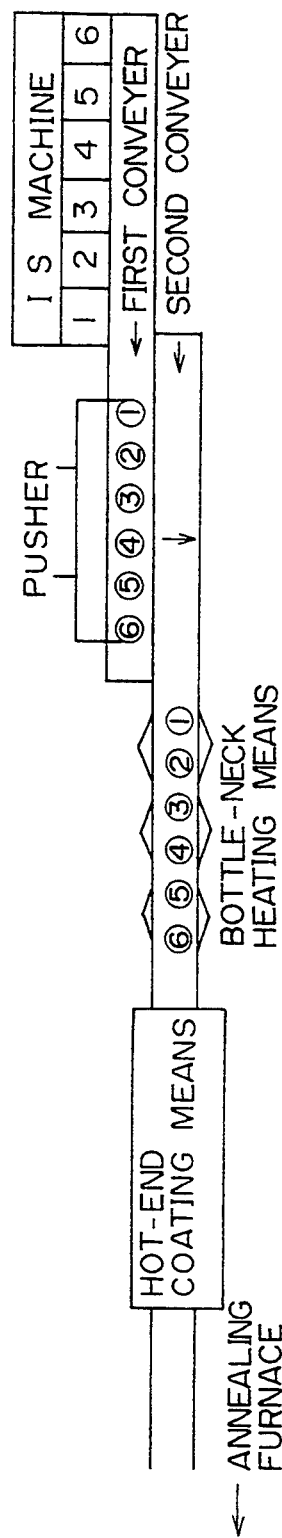
FIG. 2 is a diagram illustrating the operation of the first embodiment of an IS bottle manufacturing machine according to the invention.
Figure 3:
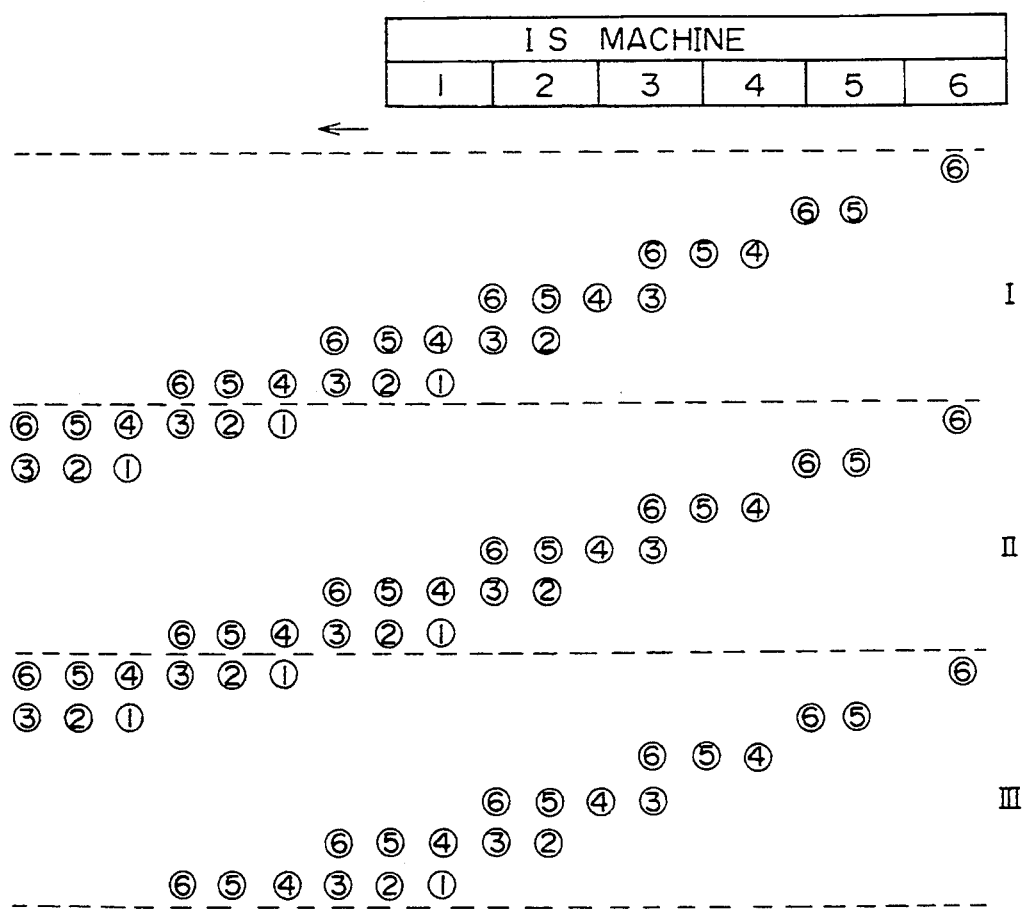
FIG. 3 is a diagram illustrating the discharging order and the arranging order on conveyors of bottles in the first embodiment illustrated in FIG. 2.

In the first embodiment, two bottle feeding conveyors have the same moving direction and naturally toward the annealing furnace, the bottles discharged from corresponding series of the machine are mounted on the first bottle feeding conveyor as a group and said group of bottles are shifted onto the second bottle feeding conveyor as a group, as shown in FIG. 2 and FIG. 3 which will hereinbelow described in more detail.

Figure 4:
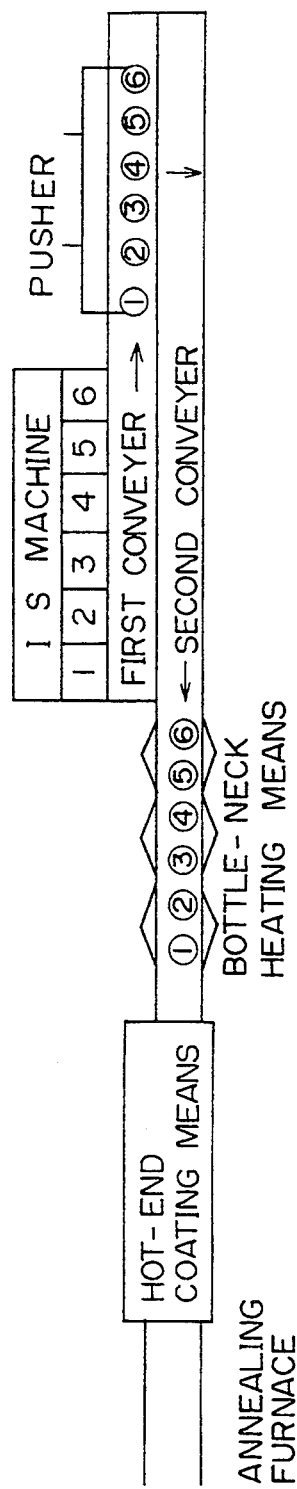
FIG. 4 is a diagram illustrating the operation of the second embodiment of an IS bottle manufacturing machine according to the invention.

The second embodiment is different from the first embodiment in that the first bottle feeding conveyor used runs in a direction backwards from the annealing furnace, as shown in FIG. 4 which will hereinbelow be described in more detail.

Figure 5:
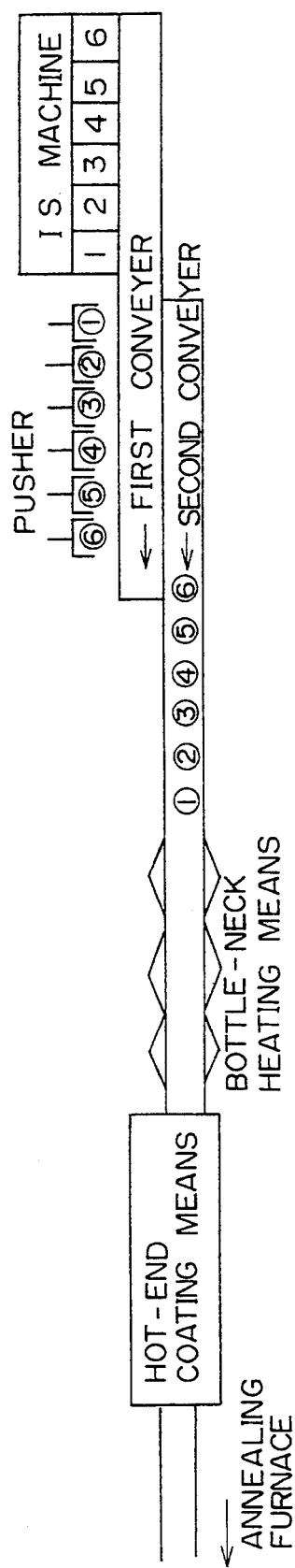
FIG. 5 is a diagram illustrating the operation of the third embodiment of an IS bottle manufacturing machine according to the invention.

The third embodiment is different from the first and second embodiments in that the shift of bottles from the first bottle feeding conveyor to the second bottle feeding conveyor is carried out individually for each bottle, not in group, as shown in FIG. 5 which will hereinbelow be described in more detail.

The first embodiments may be considered most preferable when it is taken into account that the second embodiment requires additional floor space for the first bottle feeding conveyor which is installed in a running direction backwards from the annealing furnace, and that the third embodiments requires the same number of pushers as the series or units of the IS bottle manufacturing machine.

It is to be noted that, as is evident from the fact that two bottle feeding conveyors are used as described above, the first bottle feeding conveyor which runs "towards the annealing furnace" does not reach actually to the furnace itself, and the expression of the second bottle feeding conveyor which runs "towards the annealing furnace" does not exclude the intervention of Hot-End-Coating apparatus on the upstream of annealing furnace. Rather, it must be said that bottle feeding to the Hot-End-Coating apparatus is one of the preferred embodiments of the present invention. This is, therefore, why the present invention is defined by an expression "receiving bottle—dischanged— on a bottle feeding conveyor, and finally feeding said bottles to an annealing furnace".

While the object of the present invention is to equalize the temperature of bottles entering into Hot-End-Coating apparatus, but this does not exclude any heating of bottles prior to entering into said Hot-End-Coating apparatus. More specifically, since the neck portion of glass bottles is cooled more than the other portions of bottle after discharging thereof due to such a process within an IS machine that a bottle or bottomed parison formed in a blank mold is usually shifted upside down into a blow mold with its neck portion gripped whereby the neck portion is cooled by the grip, and since said neck portion is further cooled until entering into the Hot-End-Coating apparatus, reheating of neck portion of bottles is a preferable step in the present invention. However, it is to be noted that the reheating apparatus used for this purpose cannot sufficiently eliminate the variation of temperature caused by the discharging order of bottles.

<First embodiment>

FIG. 2 is a diagram illustrating the first embodiment of the present invention.

In this embodiment, the IS bottle manufacturing machine used consists of six series or units, the first bottle feeding conveyor for receiving bottles discharged from the machine and the second bottle feeding conveyor which is parallel to the first conveyor both run toward the annealing furnace, the latter passing through the Hot-End-Coating apparatus. The discharging order from the IS bottle manufacturing machine is an order of 6-5-4-3-2-1 starting from the discharging position 6 farthest from the annealing furnace and ending in the position 1 nearest to the annealing furnace. The arranging order of bottles on the first bottle feeding conveyor is the same as the discharging order in the moving direction of conveyor, i.e. 6-5-4-3-2-1 in which the firstly discharged bottle ⑥ stands nearest to the annealing furnace and the lastly discharged bottle ① stands farthest from the annealing furnace.

The arranging order 6-5-4-3-2-1 of bottles on the first bottle feeding conveyor means that a bottle has been discharged first from the unit 6 onto the first bottle feeding conveyor and a bottle has been discharged from the adjacent series 5 after the elapse time of t, and the preceding of said bottle 6 to the bottle 5 means that speed ($V_1$) is sufficient for said bottle ⑥ to pass the discharging position 5 within a time period t.

If the speed ($V_1$) is slower and $V_1 t = h$, the bottle ⑥ will stand just on the discharging position of the bottle ⑤, so that the collision between these bottles is not prevented. If $V_1 t < h$, the bottle ⑥ can not precede the bottle ⑤. In a preferred embodiment, said ($V_1$) is three times larger than that of a conveyor used in combination with a conventional IS bottle manufacturing machine. Further in this preferred embodiment, the speed of the second bottle feeding conveyor, $V_2$, is the same as that of a conveyor used in combination with a conventional IS bottle manufacturing machine. The speed of bottle feeding conveyor used in combination with a conventional IS bottle manufacturing machine (having six units with the width of unit 21 inches ) is h/2, i.e. 10.5 inches, per time period t. This means that a bottle discharged from a unit progresses up to the border line between the unit in question an adjacent unit in the time period t.

Once bottles 6 and 5 are placed on the first bottle feeding conveyor, the relative position between these two bottles and thus the distance $\Delta L$ are constant irrespective of time, and these are not varied even when both bottles are shifted on the second bottle feeding conveyor by means of a pusher.

Accordingly, the bottle ⑥ stands at the position nearest to the annealing furnace on the first conveyor stands on the second conveyor also at the position nearest to the annealing furnace, thus still preceding the bottle 5 on the second conveyor.

When the speed of the second bottle feeding conveyor is controlled so that the following bottle ⑤ will enter into the annealing furnace after time period t from the moment where the preceding bottle ⑥ has entered into the furnace, the time period for the bottle ⑥ to enter into the annealing furnace after discharging from the IS bottle manufacturing machine will be $t + T$ (wherein, T is an additional time period necessary for bottle ⑥ to enter into the furnace after the elapse of t, that is the time period from the discharging of bottle ⑤ up to the moment when the bottle ⑥ enters into the annealing furnace), while the time period necessary for bottle ⑤ from discharging up to entering into the furnace will be $T + t$. Thus, bottles ⑥ and ⑤ have the same time elapsed from discharging moment from the IS bottle manufacturing machine up to entering moment into the annealing furnace. Since both bottles discharged from the IS bottle manufacturing machine with the same temperature enter into the annealing furnace after the same time elapsed, the cooling rate on these bottles are also the same, so that the problem formed on a conventional IS bottle manufacturing machine that the temperatures of these bottles when entering into the annealing furnace are not equal is eliminated. As described above, this problem is more serious when a Hot-End-Coating apparatus is used than when no such an apparatus is used.

With respect to the speed $V_2$ of the second bottle feeding conveyor, the following equation applies, wherein the unit of time used for speed is t.

Namely, the travelling distance of bottle ⑥ for a time period t is $V_1 t$, and the distance $\Delta L$ between bottle ⑥ and bottle ⑤ discharged after time period of t is calculated as $V_1 t - h$, where h is a distance between adjacent units, where a $\Delta L$ corresponds to $V_2 t$.

$$\Delta L = V_1 t - h = V_2 t$$

Accordingly, $$V_2 = V_1 - h/t$$

The above description is given in terms of bottles ⑥ and ⑤, but it is the same with any combinations of adjacent bottles, i.e. bottles ⑤-④, ④-③, ③-② and ②-①.

FIG. 3 is a diagram illustrating discharging of bottles and arranging thereof on conveyors in the first embodiment. The IS bottle manufacturing machine used herein is conventional and comprises 6 units of 21 inch width, but is combined with a bottle feeding conveyor of a speed which is three times larger than that of conventional one, i.e. (h/2)×3 (=31.5 inches) per time period t. In this drawing, the figures such as ① and so on designate respective bottles discharged from corresponding units 1 and so on. The broken line between I and II illustrates that a discharging cycle of bottles from units 6-1 has been finished.

As is clear from FIG. 3, there is a distance on the first conveyor corresponding to (h/2)×13 between the tail bottle ① of the first group and the leading bottle ⑥ of the second group. Since there is such a distance between the groups of bottles, it is easy to shift a group of bottle from the first bottle feeding conveyor onto the second bottle feeding conveyor even if there is a difference of speeds such as $V_2/V_1 = \frac{1}{3}$ between the second and first bottle feeding conveyors.

<Second Embodiment>

The principle of time control described above concerns the case wherein both bottle feeding conveyors run towards the annealing furnace or the Hot-End-Coating apparatus located in the upstream thereof, but this control principle is effective also in the case wherein the first bottle feeding conveyor run backwards from the annealing furnace or the Hot-End-Coating apparatus, with the second bottle feeding conveyor running towards the slow cooling furnace.

However, this second embodiment is different from the first embodiment in that glass bottles are discharged from the IS bottle manufacturing machine in an order starting from the nearest bottle from the annealing furnace and successively ending in the farthest bottle therefrom while a bottle firstly comes out from the IS machine stands at the nearest position from the annealing furnace and a bottle lastly comes out from the IS machine stands at a position farthest to the annealing furnace as in the first embodiment, and that the relation between speed of two conveyors $V_1$ and $V_2$ is illustrated by the equation:

$$V_2 = -(V_1 - h/t)$$

In order to operate the first bottle feeding conveyor in a running direction backwards from the annealing furnace and to arrange bottles on said conveyor in the order described above, speed of the first bottle feeding conveyor is relatively low, for example in the order of commercially used speed with the typical IS bottle manufacturing machine, i.e. running distance h/2 per time period t with the reverse direction of the conveyor. In this embodiment, the running speed of the second bottle feeding conveyor is, for example, h/2 per time period t with running direction reverse to that of the first bottle feeding conveyor.

<Third Embodiment>

The third embodiment is similar to the first embodiment in that two conveyors respectively running towards the annealing furnace are used; and to the second embodiment in that glass bottles are successively discharged starting from the discharging position nearest from the annealing furnace and ending in the position farthest therefrom, and also in that the firstly discharged bottle takes a position nearest to the annealing furnace and the lastly discharged bottle takes a position farthest therefrom thereby to be arranged in the same order as the discharging order on the second bottle feeding conveyor. However, this third embodiment is different from the first and second embodiments in that when the bottles discharged on the first bottle feeding conveyor come respectively to predetermined positions, these bottles are individually shifted onto the second bottle feeding conveyor, not in a group of bottles arranged on the first bottle feeding conveyor.

The third embodiment comprises step of: (a) receiving bottles discharged from discharging positions of the bottle manufacturing machine onto a first bottle feeding conveyor running towards said annealing furnace with the same discharging order as the discharging positions, by firstly discharging the bottle located at the position nearest to the annealing furnace and lastly discharging the bottle located at the position farthest from the annealing furnace; (b) shifting the bottles arranged on the first conveyor individually onto a second conveyor which is arranged in parallel relationship with the first conveyor and runs toward the annealing furnace; (c) conducting the shifting of bottles from the first bottle feeding conveyor onto the second bottle feeding conveyor by pushers located along a side of the first bottle feeding conveyor so that each pusher pushes each bottle, these pushers being arranged in such a manner that the pusher corresponding to the bottle discharged from the discharging position nearest to the annealing furnace is located on the most upstream side and the pusher corresponding to the bottle discharged from the discharging position farthest from the annealing furnace is located on the most downstream side, and the distance d between adjacent pushers is defined as $d = h \times V_2/(V_1 - V_2)$ wherein the speed of the first conveyor is designated by $V_1$, that of the second conveyor is designated by $V_2$, and the distance between adjacent discharging positions is designated by h, whereby the order of bottles on the second conveyor is the same as that on the dischanging order from the bottle manufacturing machine so that the firstly discharged bottle stands at the nearest position and the lastly discharged bottle stands at the farthest position with respect to the annealing furnace, (d) controlling the speeds of said two conveyors as described in the equation:

$$V_1 = V_2 \times (d+h)/d$$

wherein the speed of the first conveyor is designated by $V_1$, that of the second conveyor is designated by $V_2$, the distance between adjacent discharging positions is designated by h, and the distance between adjacent pushers is designated by d.

FIG. 5 is a diagram illustrating the third embodiment, in which when the bottle ① discharged from unit 1 comes to the position of pusher for the bottle ①, this pusher is operated to shift the bottle ① onto the second bottle feeding conveyor. In the same manner, when the bottle ⑥ discharged from unit 6 comes to the most downstream position of pusher for the bottle ⑥, this pusher is operated to shift the bottle ⑥ onto the second bottle feeding conveyor. If the speed of the first conveyor $V_1$ is set three times larger than that of a conventional conveyor used in combination with a conventional IS bottle manufacturing machine, i.e. (h/2)×3 per time period t, and the speed of the second conveyor is set at the same value as that of a conventional used in combination with a conventional IS bottle manufacturing machine, the most early discharged bottle ① comes to a position nearest to the annealing furnace, so that a group of bottles arranged in the order of 1-2-3-4-5-6 are obtained on the second conveyor. This order is again characterized by that the time periods necessary for respective discharged bottles to enter into the annealing furnace are equalized.

The pushers corresponding to respective bottles are arranged in such a manner that the pusher corresponding to the firstly discharged bottle ① is located on the most upstream side and the pusher corresponding to the the lastly discharged bottle ⑥ is located on the most downstream side, and the distance d between adjacent pushers is defined as $d = h \times V_2/(V_1 - V_2)$ wherein the speed of the first conveyor is designated by $V_1$, that of the second conveyor is designated by $V_2$, and the distance between adjacent discharging positions is designated by h.

<Fourth and Fifth Embodiment>

These embodiment are directed to apparatuses for carrying out the methods of the present invention.

Particulars of the apparatuses are given hereinabove in terms of the methods.

No further description may be required.

EXAMPLES

Example 1

Six section 1 unit IS bottle manufacturing machine (double cavity for simultaneous producing of two bottles, unit width 21 inches, in left flowing direction) was used. Glass bottles discharged from respective discharging positions of each unit were placed first on dead plate prior to the conveyor, with the dead plate times being equal in all units. The discharged bottles were then moved onto a first bottle feeding conveyor having a speed (3×10.5 inches per gob cut) three times larger than that of actually used conveyors, namely 10.5 inch per 3×1 gob cuts in a firing order of 6-5-4-3-2-1. As a result, when unit 1 has been passed, a group of six units (12 bottles) were formed, with these bottles being arranged in the order of 6-5-4-3-2-1 and with the same distances (the same 5.25 inches as the known machine). Until the following group (12 bottles) arrives at the same place, there is obtained a lag time corresponding to two groups (24 bottles). This lag time was used for shifting the first group to a second bottle feeding conveyor having a conventional speed (10.5 inches per 1 gob cut) and for charging the same group into a Hot-End-Coating apparatus provided on this conveyor, whereby the time periods for respective bottles discharged to enter into the Hot-End-Coating apparatus were equalized (Refer to FIG. 2).

Example 2

Six section 1 unit IS bottle manufacturing machine (double cavity for simultaneous producing of two bottles, unit width 21 inches, in left flowing direction) was used. Glass bottles discharged from the machine via respective dead plate of units (dead plate times being equal in all units) were then moved onto a first bottle feeding conveyor having a usual speed in the backward direction (10.5 inches per gob cut), in a firing order of 1-2-3-4-5-6. When unit 6 has been passed, discharged bottles were arranged with equal distances (each 5.25 inches) with each other in an order reverse to the firing order in the bottles preceding direction, i.e. in the order of 6-5-4-3-2-1.

A group of 12 bottles for six units were then shifted on a second bottle feeding conveyor running with the same speed as that of the first bottle feeding conveyor and in a direction reverse to that of said first conveyor and the group of bottles were put into a Hot-End-Coating apparatus provided on the second conveyor in the order of 1-2-3-4-5-6, whereby to equalize the time periods necessary for respective bottle to enter into said Hot-End-Coating apparatus (Refer to FIG.4).

Example 3

Six section i unit IS bottle manufacturing machine (double cavity for simultaneous producing of two bottles, unit width 21 inches, in left flowing direction) was used. Glass bottles discharged from the machine via respective dead plate of units (dead plate times being equal in all units) were then moved onto a first bottle feeding conveyor having a speed three times larger than that of usual conveyor ($3 \times 10.5$ inches per 1 gob), in a firing order of 1-2-3-4-5-6. A bottle charged from unit 1 nearest to the annealing furnace was charged immediately on a second bottle feeding conveyor having usual speed (10.5 inches per 1 gob cut). The bottle discharged from unit 2 was also shifted from the first bottle feeding conveyor having the three-times speed at a position 10.5 inches downstream from the shifting position of the bottle discharged from unit 1. In the same way, the bottles discharged from unit 3 . . . n were shifted from the first conveyor having three-time speed onto the second conveyor having the usual speed at the positions $21 \ldots 10.5 \times (n-1)$ inches downstream from the shifting position of the bottle 1. As a result, when the last bottle discharged from unit 6 had been shifted onto the second conveyor, bottles on this conveyor were arranged in the firing order and with equal distances (5.25 inches as in the usual apparatus), whereby the time periods necessary of respective bottles to enter into the Hot-End-Coating apparatus were equalized (Refer to FIG. 5).

As described above, the problem of unevenness of bottle temperatures at the entry of annealing furnace due to the variation of time periods necessary for respective bottles discharged from the IS bottle manufacturing machine to reach the annealing furnace has been solved by an equalization of said time periods.

What is claimed is:

1. In a method of manufacturing glass bottles comprising the steps of receiving bottles successively discharged in a hot state from a plurality of discharging positions on a bottle manufacturing machine arranged substantially in line and substantially with same distances therebetween and putting said bottles onto bottle feeding conveyors, for feeding said bottles to an annealing furnace, the improvement comprises:

(a) discharging bottles in the order from the discharging position farthest from the annealing furnace successively to the position nearest to the annealing furnace so that the bottle at the position farthest from the annealing furnace firstly comes out and the bottle at the position nearest to the annealing furnace lastly comes out:

(b) receiving the discharged bottles on a first bottle feeding conveyor running towards said annealing furnace with the same order of said bottles arranged on said first conveyor as the discharging order, so that the firstly discharged bottle stands at the position nearest to the annealing furnace and the lastly discharged bottle stands at the position farthest from the annealing furnace;

(c) shifting the group of bottles arranged on the first conveyor onto a second conveyor which is arranged in parallel relationship with the first conveyor so as to reach the annealing furnace;

(d) controlling the speeds of said two conveyors as described in the equation:

$$V_2 = V_1 - h/t$$

wherein, the speed of first conveyor is designated by $V_1$, the speed of second conveyor is designated by $V_2$, the distance between adjacent discharging positions is designated by h, and the time lag between bottle discharges from adjacent discharging positions is designated by t.

2. The method of manufacturing glass bottles as claimed in claim 1, wherein bottles on said second bottle feeding conveyor are subjected to a surface treatment of said bottles prior to charging the bottles into said annealing furnace.

3. The method for manufacturing glass bottles as claimed in claim 2, wherein said surface treatment of said bottles comprises contacting said bottles with vapor of a substance which can form a membrane based on $SnO_2$ or $TiO_2$.

4. An apparatus for manufacturing glass bottles combined with an annealing furnace comprising:

(i) An IS machine for manufacturing glass bottles comprising a plurality of units for carrying out a series of processes of receiving a predetermined volume of molten glass, introducing said molten glass into a blank mold to transform it into a cylindrical body having a bottom, shifting said cylindrical body into a blow mold in which said cylindrical body is expanded into a bottle having an outer shape corresponding to the inner surface of said blow mold by blowing of gas, and discharging the finished bottle successively in hot state, with said units being arranged adjacent to each other substantially in line, and with the discharging order of bottles being from the discharging position farthest from the annealing furnace and successively to the position nearest to the annealing furnace;

(ii) a first bottle feeding conveyor running toward the annealing furnace and carrying thereon the bottles successively discharged from said bottle manufacturing machine;

(iii) a second bottle feeding conveyor arranged in parallel relationship with said first bottle feeding conveyor and running toward said annealing furnace;

(iv) a pusher for pushing laterally a group of bottles on said first bottle conveyor and shifting the same onto said second bottle conveyor, the speeds of said two conveyors being controlled as described in the equation:

$$V_2 = V_1 - h/t$$

wherein the speed of first conveyor is designated by $V_1$, the speed of second conveyor is designated by $V_2$, the distance between adjacent discharging positions is designated by h, and the time lag between bottle discharges from adjacent discharging positions is designated by t.

* * * * *